(12) United States Patent
Di Giulio et al.

(10) Patent No.: US 7,475,108 B2
(45) Date of Patent: Jan. 6, 2009

(54) SLOW-DYNAMIC LOAD BALANCING METHOD

(75) Inventors: Domenico Di Giulio, Rome (IT); Bruno Portaluri, Bari (IT); Ricardo Rossi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 897 days.

(21) Appl. No.: 10/869,514

(22) Filed: Jun. 16, 2004

(65) Prior Publication Data

US 2004/0267930 A1 Dec. 30, 2004

(30) Foreign Application Priority Data

Jun. 26, 2003 (FR) .................................. 03 368063

(51) Int. Cl.
*G06F 15/16* (2006.01)

(52) U.S. Cl. .................. 709/203; 709/223; 709/226

(58) Field of Classification Search ................ 709/201, 709/203, 225, 226, 229, 223; 718/105
See application file for complete search history.

(56) References Cited

U.S. PATENT DOCUMENTS

| | | | | |
|---|---|---|---|---|
| 5,283,897 A * | 2/1994 | Georgiadis et al. | .......... | 718/105 |
| 5,828,847 A * | 10/1998 | Gehr et al. | .......... | 709/239 |
| 5,860,137 A * | 1/1999 | Raz et al. | .......... | 711/202 |
| 5,951,694 A * | 9/1999 | Choquier et al. | .......... | 714/15 |
| 6,003,083 A * | 12/1999 | Davies et al. | .......... | 709/226 |
| 6,026,425 A * | 2/2000 | Suguri et al. | .......... | 718/105 |
| 6,067,545 A * | 5/2000 | Wolff | .......... | 707/10 |
| 6,078,943 A * | 6/2000 | Yu | .......... | 718/105 |
| 6,078,960 A * | 6/2000 | Ballard | .......... | 709/229 |
| 6,112,239 A * | 8/2000 | Kenner et al. | .......... | 709/224 |
| 6,167,427 A * | 12/2000 | Rabinovich et al. | .......... | 709/201 |
| 6,182,142 B1 * | 1/2001 | Win et al. | .......... | 709/229 |
| 6,385,636 B1 * | 5/2002 | Suzuki | .......... | 718/105 |
| 6,393,458 B1 * | 5/2002 | Gigliotti et al. | .......... | 709/203 |
| 6,606,643 B1 * | 8/2003 | Emens et al. | .......... | 709/203 |
| 6,922,724 B1 * | 7/2005 | Freeman et al. | .......... | 709/223 |
| 7,035,918 B1 * | 4/2006 | Redding et al. | .......... | 709/223 |
| 7,062,556 B1 * | 6/2006 | Chen et al. | .......... | 709/226 |
| 7,127,716 B2 * | 10/2006 | Jin et al. | .......... | 718/105 |
| 7,203,747 B2 * | 4/2007 | Bhat et al. | .......... | 709/224 |
| 7,231,445 B1 * | 6/2007 | Aweya et al. | .......... | 709/226 |
| 7,254,626 B1 * | 8/2007 | Kommula et al. | .......... | 709/223 |
| 7,284,067 B2 * | 10/2007 | Leigh | .......... | 709/238 |
| 2002/0049838 A1 * | 4/2002 | Sylor et al. | .......... | 709/224 |

(Continued)

*Primary Examiner*—Saleh Najjar
*Assistant Examiner*—Waseem Ashraf
(74) *Attorney, Agent, or Firm*—William A. Kinnaman, Jr.

(57) ABSTRACT

A load balancing method and a corresponding system are proposed. The load balancing method is used in environments (e.g., implementing a licensing management application) wherein each client is associated with a preferred server storing specific information for the client. Each client periodically detects a workload and a response time of all the servers. The client selects a subset of nearest servers (according to their response times). The server in that subset with the lowest workload is set as an eligible server. Whenever a ratio between the workload of the preferred server and the workload of the eligible server exceeds a predefined threshold value (e.g., 1.1), the client switches to the eligible server (transferring the corresponding specific information). The method of the invention exhibits a slow dynamic, and tends to reach a steady condition (wherein the specific information of the clients is not continuously moved across the system).

9 Claims, 7 Drawing Sheets

U.S. PATENT DOCUMENTS

| | | | |
|---|---|---|---|
| 2002/0052942 A1* | 5/2002 | Swildens et al. | 709/223 |
| 2002/0138559 A1* | 9/2002 | Ulrich et al. | 709/203 |
| 2002/0194335 A1* | 12/2002 | Maynard | 709/225 |
| 2002/0198995 A1* | 12/2002 | Liu et al. | 709/226 |
| 2003/0120724 A1* | 6/2003 | Kawashimo et al. | 709/203 |
| 2003/0126200 A1* | 7/2003 | Wolff | 709/203 |
| 2004/0073639 A1* | 4/2004 | Basoglu et al. | 709/223 |

* cited by examiner

SLOW-DYNAMIC LOAD BALANCING METHOD

BACKGROUND OF THE INVENTION

1. Field of the Invention

The present invention relates to the data processing field, and more specifically to a load balancing method and a corresponding system.

2. Description of the Related Art

Load balancing methods are commonly used in data processing systems with a distributed architecture, wherein several clients rely on resources managed by multiple servers. The object of the load balancing methods is that of distributing the requests coming from the clients across the servers, such that overall performance of the system is increased.

A typical example is that of a server farm, which consists of a cluster of mirrored servers; the mirrored servers store identical information and provide the same services to the clients. The clients access the server farm through a router, which is the only unit visible to the outside. Whenever a client attempts to contact the server farm, the corresponding request is received by the router, which selects the server in the cluster that is best suited to handle the request.

For this purpose, a number of different algorithms have been proposed in the last years. A conventional approach consists of assigning each request to the servers according to a round-robin policy. More sophisticated techniques propose detecting a workload of each server; the server having the lowest workload is then selected for servicing the request.

An additional problem arises when information specific for each client must be stored on the servers (such as in a licensing management application). In this case, when the number of clients is very high (for example, more than 100,000), it is not feasible to replicate the specific information for all the clients on the different servers. A solution commonly adopted is that of dynamically assigning each client to a preferred server, which only stores the specific information for the corresponding clients; all the requests of each client are then transmitted to the preferred server directly. Whenever the client switches to a different server, the corresponding specific information is transferred to the new preferred server.

However, in these environments the load balancing methods known in the art are not completely satisfactory. Indeed, the techniques commonly used involve frequent switching of the clients between different preferred servers. As a consequence, the specific information of the clients must be continuously moved across the system. These operations adversely affect the overall performance of the system, and can defeat the advantages provided by the load balancing method.

SUMMARY OF THE INVENTION

It is an object of the present invention to provide a load balancing method that reduces the switching of the clients between different servers.

It is another object of the present invention to provide a method that tends to reach a steady condition, wherein the specific information of the clients is not continuously moved across the system.

It is another object of the present invention to distribute the clients across the servers without impairing the overall performance of the system.

The accomplishment of these and other related objects is achieved by a load balancing method for use in a data processing system with a distributed architecture including a plurality of servers and a plurality of clients, for each client the method including the steps of: associating the client with a preferred one of the servers, the preferred server storing specific information for the client, detecting an indication of a workload and an indication of a response time of each server, selecting an eligible one of the servers according to the workload and the response time of each server, calculating at least one comparison parameter indicative of a performance difference between the preferred server and the eligible server, and switching the preferred server to the eligible server and transferring the specific information to the eligible server in response to the reaching of a predefined threshold by the at least one comparison parameter.

Moreover, the present invention also provides a computer program for performing the method and a computer program for running on each client, together with corresponding products storing the programs. A load balancing system and a client for use in the system are also encompassed.

The novel features believed to be characteristic of this invention are set forth in the appended claims. The invention itself, however, as well as these and other related objects and advantages thereof, will be best understood by reference to the following detailed description to be read in conjunction with the accompanying drawings.

DESCRIPTION OF THE PREFERRED EMBODIMENTS

Figure 1A:
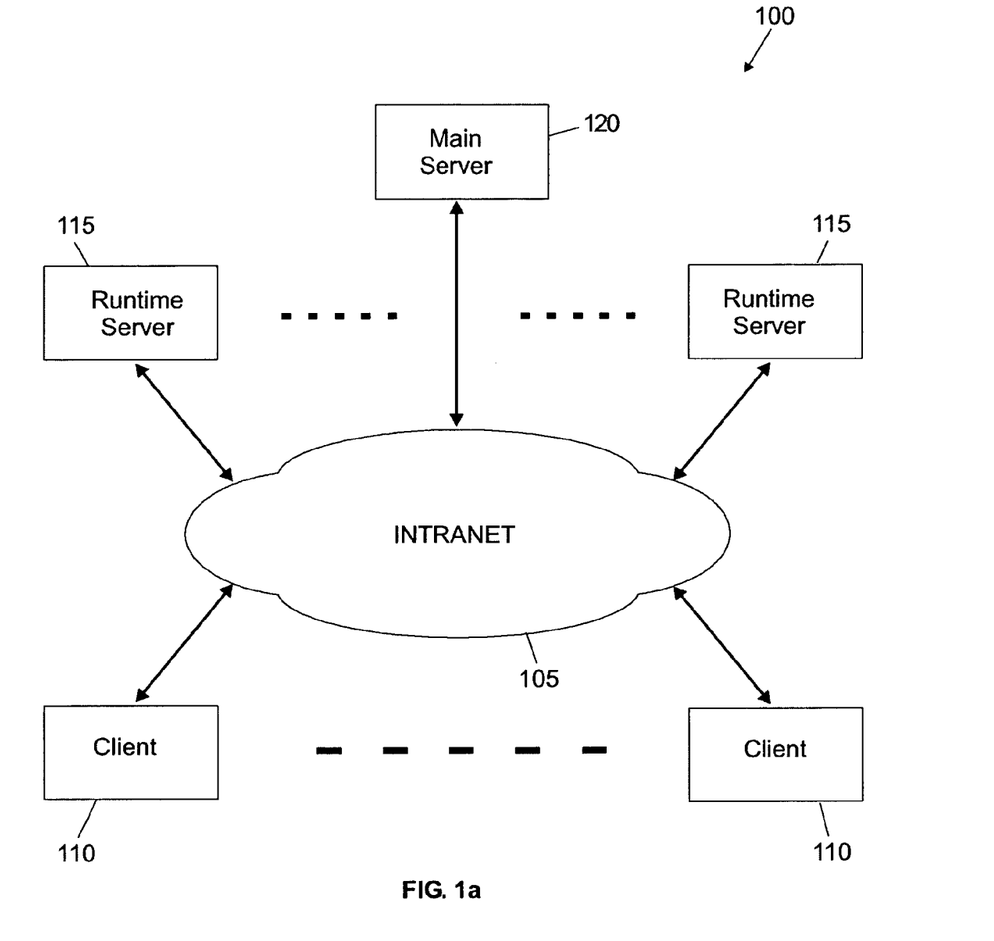
FIG. 1a is a pictorial representation of a data processing system in which the method of the invention can be used.

With reference in particular to FIG. 1a, a data processing system 100 with a distributed architecture is shown. The system 100 is based on a communication network 105 (for example, an intranet). The system 100 includes a large number of clients 110 (for example, more than 100,000); typically, the clients 110 consist of laptop computers, which can move in the system 100 freely (connecting to the network 105 from different access points around the world). Each client 110 relies on resources managed by multiple runtime servers 115 (generally consisting of powerful computers); for example, the system 100 includes some tens of runtime servers 115, which are distributed across different sites in several countries. A main server 120 controls the runtime servers 115 from a central point of the system 100.

Figure 1B:
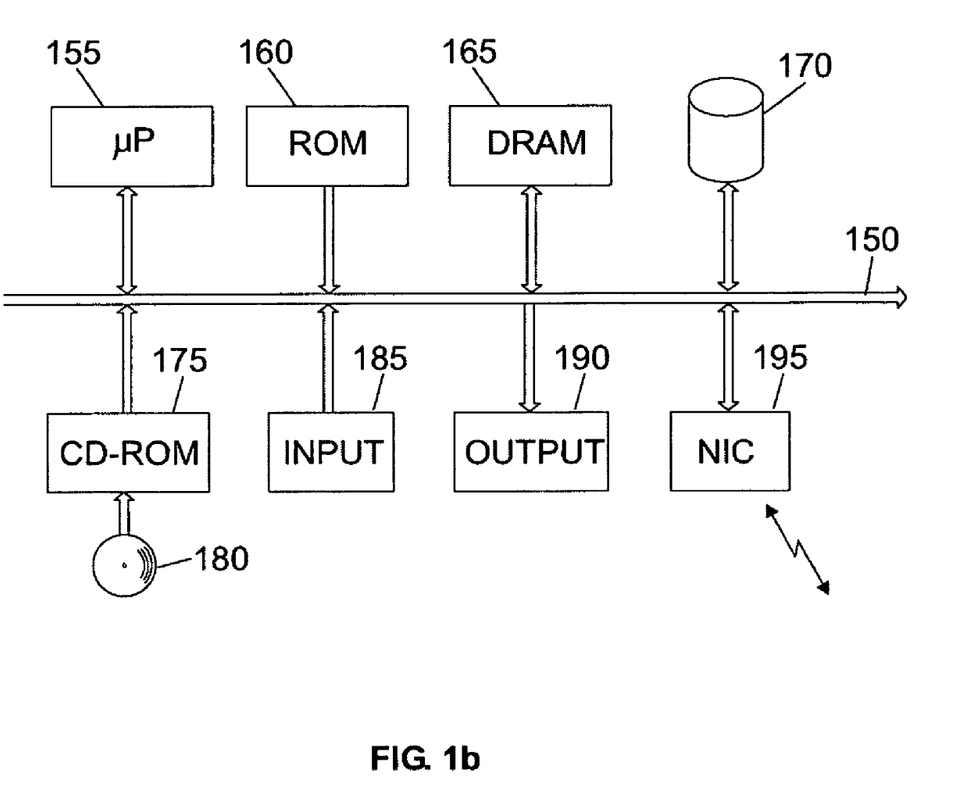
FIG. 1b shows a schematic block diagram of a generic computer of the system.

Considering now FIG. 1b, a schematic block diagram of a generic computer of the system 100 (client, runtime server or main server) is shown. The computer is formed by several units, which are connected in parallel to a communication bus 150. In detail, one or more microprocessors (µP) 155 control operation of the computer, a read-only memory (ROM) 160 stores basic code for a bootstrap of the computer, and a dynamic random-access memory (DRAM) 165 is directly used as a working memory by the microprocessors 155. Several peripheral units are further connected to the bus 150 (by means of respective interfaces). Particularly, a mass memory consists of a magnetic hard disk 170 and a driver 175 for reading CD-ROMs 180. Moreover, the computer includes input devices 185 (for example, a keyboard and a mouse), and output devices 190 (for example, a monitor and a printer). A network interface card (NIC) 195 is used to connect the computer to the system 100.

However, the concepts of the present invention are also applicable when the system has another architecture (even without the main server), when a different number of runtime servers and/or clients are provided, or when the system is based on another network (for example, the Internet). Similar considerations apply if the computers have a different structure or include other units, if the computers are replaced with equivalent data processing entities, and the like.

Figure 2:
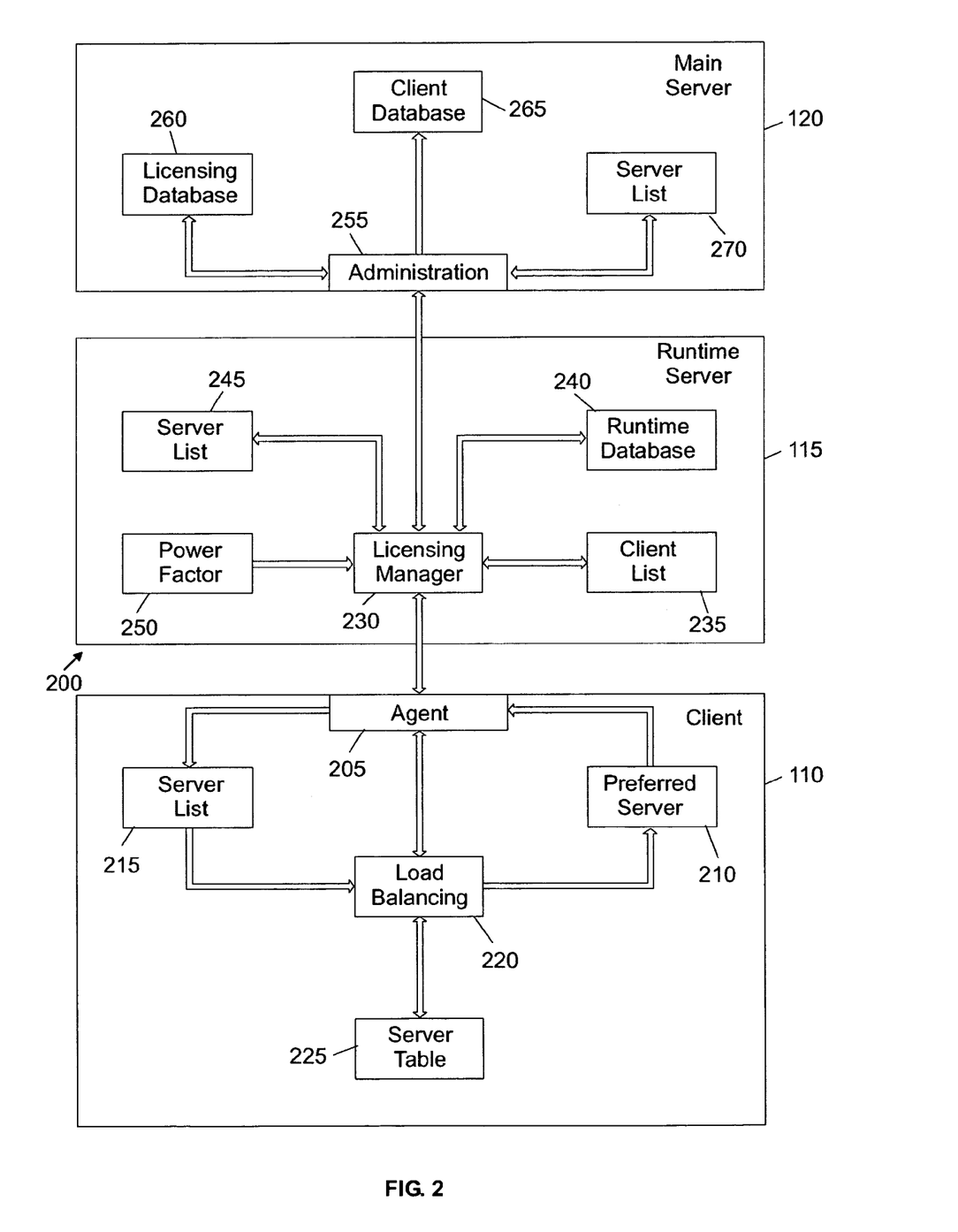
FIG. 2 depicts a functional scheme of the system.

As shown in FIG. 2, the above-described system 100 implements a licensing management application 200. The licensing application 200 is used to control compliance of software products running on the clients with respective authorized conditions of use (for example, defining the maximum number of clients that can run each software product simultaneously). The licensing application 200 relies on a three-tiered architecture (main server, runtime servers and clients).

In detail, an agent 205 runs in the background on each client 110 (without requiring any user intervention). The agent 205 controls the execution of different operations on the client 110; for example, the agent 205 collects information about a software and hardware configuration of the client 110, detects the starting and stopping of software products, automatically upgrades the software products, and so on.

The client 110 is associated with (or plugged on) a preferred one of the runtime servers 115; the preferred server 115 is identified by its address, which is stored in a register 210 (accessed by the agent 205). Moreover, the agent 205 maintains a table 215 storing a list of all the runtime servers that are available in the system.

The agent 205 interfaces with a load balancing module 220. As described in detail in the following, the load balancing module 220 distributes the clients across the runtime servers (in an attempt to optimize the performance of the whole system). For this purpose, the load balancing module 220 accesses the server list 215, and then updates the preferred server register 210 accordingly. Operation of the load balancing module 220 involves the management of a further table 225, which stores information about dynamic characteristics of all the runtime servers. Particularly, each record of the server table 225 stores a value indicating a workload and a value indicating an average response time of the corresponding runtime server; moreover, the record includes an array with the values of the most recent response times measured for the runtime server (for example, the last ten).

The agent 205 communicates with a licensing manager 230, which is installed on the preferred server 115 associated with the client 110. The main task of the licensing manager 230 is that of enabling or preventing execution of the software products on the plugged clients. The licensing manager 230 provides additional services to the plugged clients (such as the deployment of the agents and of any software product upgrade). Moreover, the licensing manager 230 receives the software and hardware configuration information collected on the plugged clients, and monitors their activity (to identify when a plugged client has been stopped or removed from the system).

The list of the clients that are plugged on the runtime server 115 is stored in a table 235 (owned by the licensing manager 230). Moreover, the licensing manager 230 maintains a database 240 including information for the runtime control of the clients; particularly, the runtime database 240 stores a set of licenses (for the software products) that have been distributed to the runtime server 115, specific information for each plugged client (for example, a list of the software products that can run on the plugged client), and the like. In this way, the runtime server 115 provides the full range of services (supported by the licensing application 200) to the plugged clients; in any case, the runtime server 115 ensures a subset of basic services for all the clients (for example, allowing a generic client to plug onto a different runtime server when the preferred one is down). The licensing manager 230 also controls a table 245, which stores a copy of the server list 215 distributed to the plugged clients. A register 250 (accessed by the licensing manager 230) is set to a value representing a power factor of the runtime server 115 (for example, equal to the number of its microprocessors).

The licensing manager 230 interfaces with an administration module 255, which is installed on the main server 120. The administration module 255 maintains a licensing database 260, which is used to store information about the software products and their authorized conditions of use. The administration module 255 gathers the information (collected by the clients and processed by the corresponding runtime servers) about the installation and the usage of the software products in the system; the gathered information is stored in a client database 265. In addition, the administration module 255 maintains a table 270, which stores the server list 245 mirrored to the runtime servers. Typically, the administration module 255 provides a web interface, which can be used to manage the information stored on the main server 120; moreover, the administration module 255 supports the creation of reports, the forwarding of e-mail notifications upon detection of unauthorized usage of software products, and the like.

However, the concepts of the present invention are also applicable when the licensing application and the corresponding data are structured in a different manner, or when other modules or functions are provided. Similar considerations apply if a different number of most recent response times are logged, or if the power factor of each runtime server is defined in another way (for example, according to the capacity of its working memory). Alternatively, the load balancing method of the invention is used in different applications (for example, for distributing the clients across the servers in a greed computing environment).

Figure 3A:
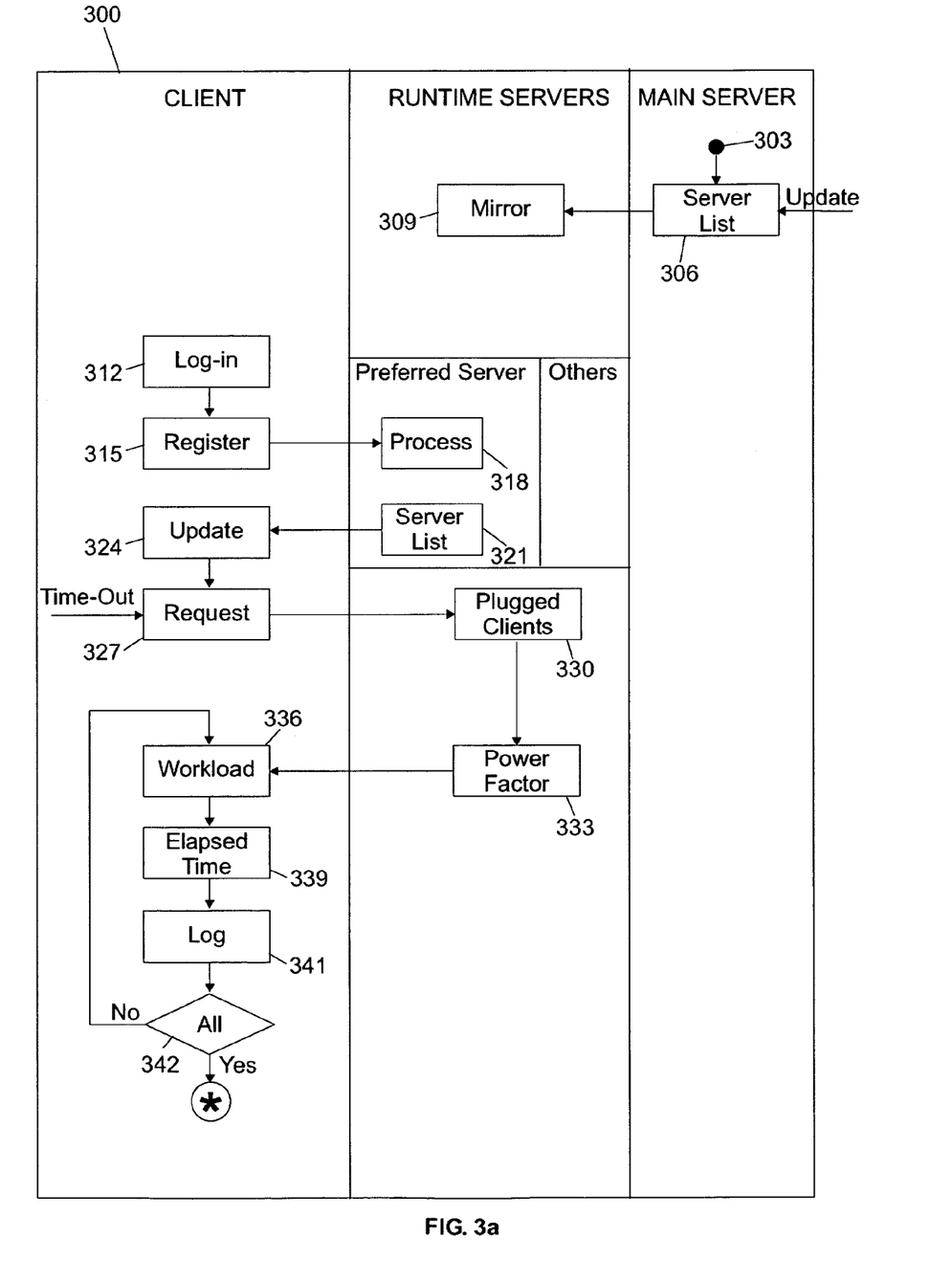
FIGS. 3a-3b describe the flow of activities of a load balancing method implemented in the system.
Figure 3B:
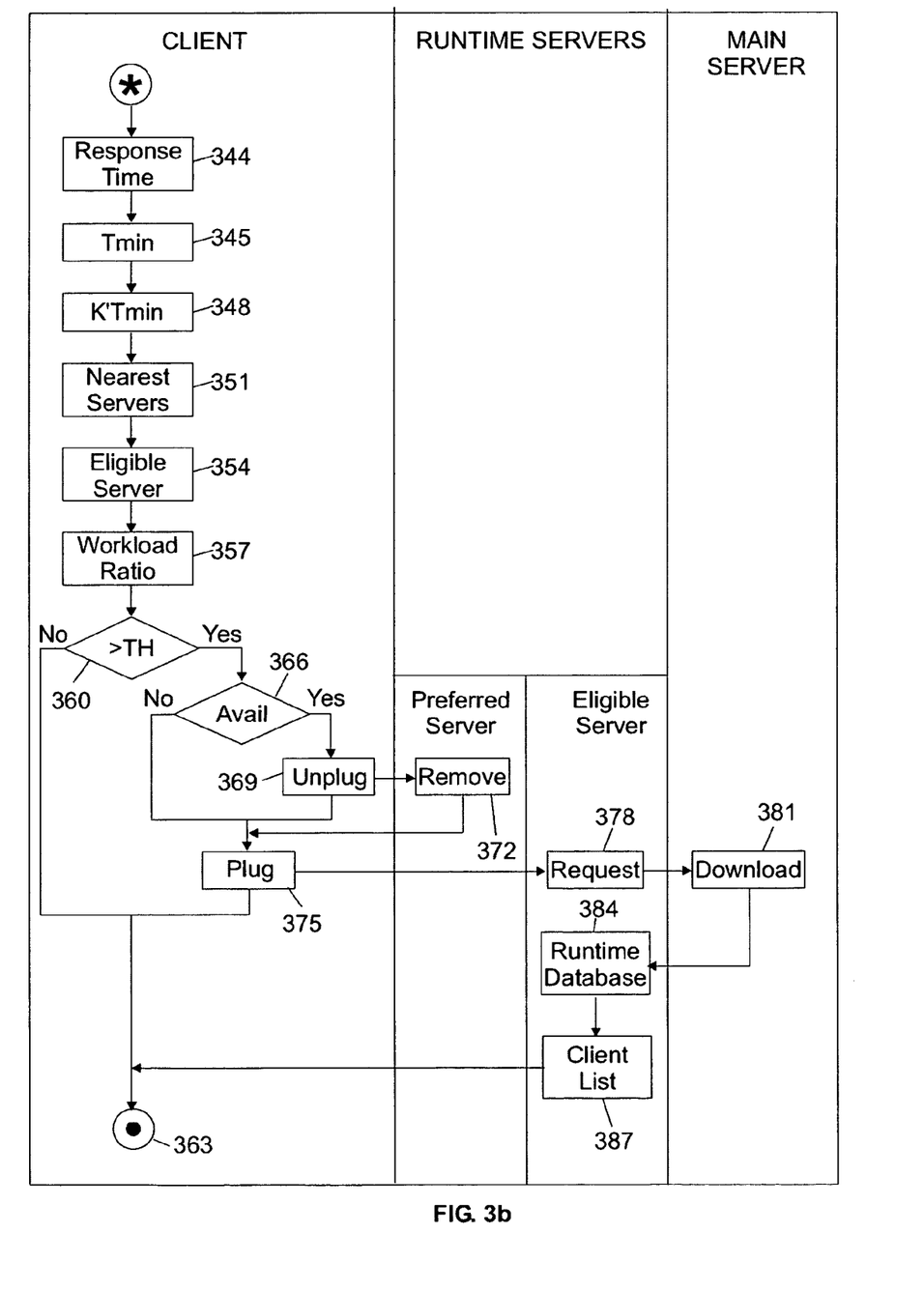

Moving now to FIGS. 3a-3b, the flow of activities involved by the execution of a load balancing method 300 in the above-described licensing application is shown. The method begins at the black start circle 303 in the swim-lane of the main server. Whenever the server list is updated (for example, deleting or adding a runtime server), the method descends into block 306, wherein the new server list is distributed to all the runtime servers. Proceeding to block 309, each runtime server receives and stores the new server list (so that the same information is mirrored on all the runtime servers).

With reference now to block 312, a user logs in a generic client of the system. The method continues to block 315, wherein the client notifies the log-in to the preferred server; for example, a registration web page of the preferred server is automatically accessed (prompting the user to enter a serial number of the client). Moving to the swim-lane of the preferred server, the information received from the client is processed at block 318. The server list (stored on the preferred server) is then transmitted to the client at block 321. In response thereto, the client at block 324 (in the corresponding swim-lane) updates its server list accordingly, if necessary.

The method passes to block 327, wherein the client transmits a request for information to each runtime server (looking through the corresponding list stored on the client); the same operation is also performed whenever a predefined time-out expires (for example, every day). In response thereto, each runtime server at block 330 (in the respective swim-lane) determines the number of plugged clients (from the corresponding list). The workload of the runtime server is estimated at block 333, dividing the number of plugged clients by the power factor (retrieved from the corresponding register).

Returning to the swim-lane of the client, the value representing the workload of each runtime server is asynchronously received at block 336. The method then passes to block 339, wherein the client measures a current response time of the runtime server as the time elapsed between the sending of the request to the runtime server (block 327) and the receiving of the response (block 336). The current response time of the runtime server is logged in the corresponding record of the server table at block 341. A test is made at block 342 to determine whether the response times of all the runtime servers have been collected. If not, the method returns to block 336 waiting for the response of a next runtime server.

As soon as all the runtime servers have been processed (or in any case after a predefined time-out, such as 10 minutes), the method descends into block 344. The load balancing module determines the average response time of each runtime server that is available (i.e., excluding the ones that have not been responding for a period longer than a threshold value, for example, 1 hour). Particularly, the average response time of each runtime server is set to the mean value of the most recent response times (extracted from the corresponding record of the server table).

Continuing to block 345, the lowest (average) response time (denoted with $T_{min}$) is identified. The method then passes to block 348, wherein the load balancing module calculates a value $T_{max}$ multiplying the lowest response time $T_{min}$ by a configurable parameter K, for example, equal to 1.5 ($T_{max}=K \cdot T_{min}$). With reference now to block 351, an acceptable range of the response times is established setting its lower limit to the value $T_{min}$ and its upper limit to the value $T_{max}$; the load balancing module then selects a subset of the runtime servers having their response time within the acceptable range (i.e., the runtime servers deemed nearest to the client from a network point of view). Proceeding to block 354, the runtime server in the subset of the nearest servers having the lowest workload (possibly discarding the preferred server) is set as an eligible server.

The method descends into block 357, wherein a comparison parameter COMP is calculated by dividing the workload of the preferred server by the workload of the eligible server. The parameter COMP is compared with a predefined threshold value (TH) at block 360. The threshold value is indicative of a substantial performance difference between the preferred server and the eligible server; for example, the performance difference must be higher than 5% and preferably is in the range form 5% to 50% (such as 10%). In the proposed implementation, wherein the performance difference is measured as the ratio between the workload of the preferred server and the workload of the eligible server, the threshold value is set to 1.1.

If the comparison parameter COMP is lower than the threshold value, the method ends at the concentric white/black stop circles 363. Conversely, the method verifies at block 366 whether the preferred server is available. For this purpose, the load balancing module periodically checks the condition of the preferred server by sending a corresponding message; the preferred server is deemed down when it has not been responding for a long period (for example, more than 1 hour). If the preferred server is available, the method continues to block 369; the client disconnects (or unplugs) from the preferred server by sending a corresponding message. In response thereto, the preferred server at block 372 removes the client from the corresponding list and deletes the specific information for the client from the runtime database. The flow of activities then continues to block 375. The same block 375 is directly reached from the block 366 if the preferred server is unavailable (thereby skipping the above-described unplug operations).

With reference now to block 375, the client plugs onto the eligible server (sending a corresponding message). The eligible server at block 378 routes the request to the main server. In response thereto, the main server at block 381 downloads the specific information for the client onto the eligible server. As soon as the specific information is received, the method continues to block 384 wherein the eligible server updates the runtime database accordingly. Proceeding to block 387, the client is inserted into the corresponding list stored on the eligible server (which can now start operating as the new preferred server for the client). The method then ends at the concentric white/black stop circles 363.

Figure 4A:
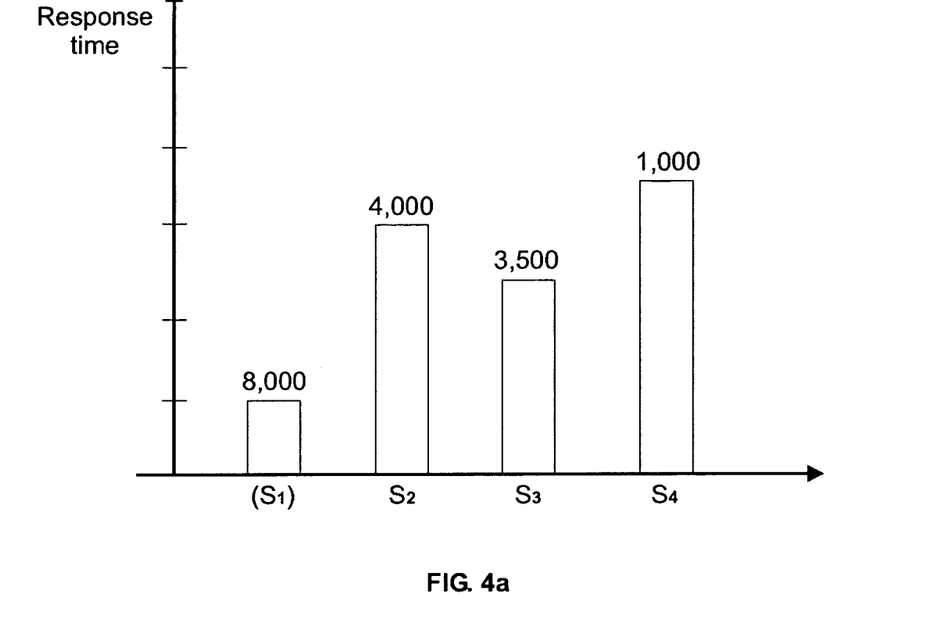
FIGS. 4a-4c show different examples of application of the load balancing method.

With reference now to FIG. 4a, let us consider a simple system with four runtime servers $S_1$-$S_4$. A generic client is plugged onto the preferred server $S_1$ (put within brackets). As shown in the qualitative diagram of the figure, the response times (in ms) and the workloads (number of plugged clients divided by the power factor) of the runtime servers $S_1$-$S_4$ are 10 and 8,000, 30 and 4,000, 25 and 3,500 and 33 and 1,000, respectively. This scenario reflects a situation wherein a local server ($S_1$) is installed in the same region of the client, whereas three remote servers ($S_2$-$S_4$) are installed far away from the client (for example, in other countries). In the above-described situation, the local server is overloaded, and cannot ensure an acceptable level of performance to the plugged clients. Therefore, a new runtime server $S_5$ is installed in the same region of the runtime server $S_1$. As a consequence, the server list is updated on the main server accordingly; the server list is automatically replicated on the runtime servers $S_1$-$S_5$ and then on the clients.

Figure 4B:
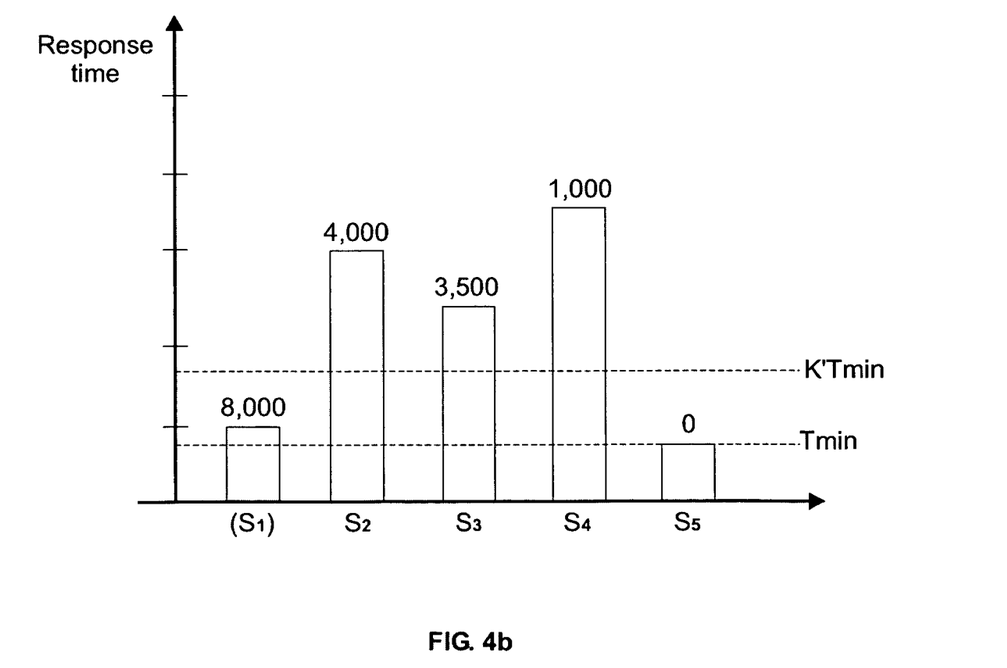

When the client runs the above-described load balancing method again, a result shown in the diagram of FIG. 4b is obtained (assuming that the characteristics of the runtime servers $S_1$-$S_4$ have not changed); as can be seen, the new runtime server $S_5$ has a low response time (for example, 8 ms) and no plugged clients. The acceptable range of the response times is defined by the lower limit $T_{min}=8$ ms and the upper limit $T_{max}=1.5 \cdot T_{min}=12$ ms. Therefore, the subset of the nearest servers will consist of the runtime servers $S_1$ and $S_5$; the runtime server $S_5$ is then set as the eligible server.

In this situation, the comparison parameter COMP=8,000/0 is greater than the threshold value 1.1. As a consequence, the preferred server is switched to the eligible server $S_5$. The same operations are repeated for any client in the region of the runtime servers $S_1$, $S_5$ (thereby decreasing the workload of the runtime server $S_1$ and increasing the workload of the runtime server $S_5$ at the same time). The system reaches a steady condition when the comparison parameter COMP falls below the threshold value 1.1 (for example, after a week); in this condition, the clients of the region will be uniformly distributed across the two available runtime servers $S_1$ and $S_5$.

Figure 4C:
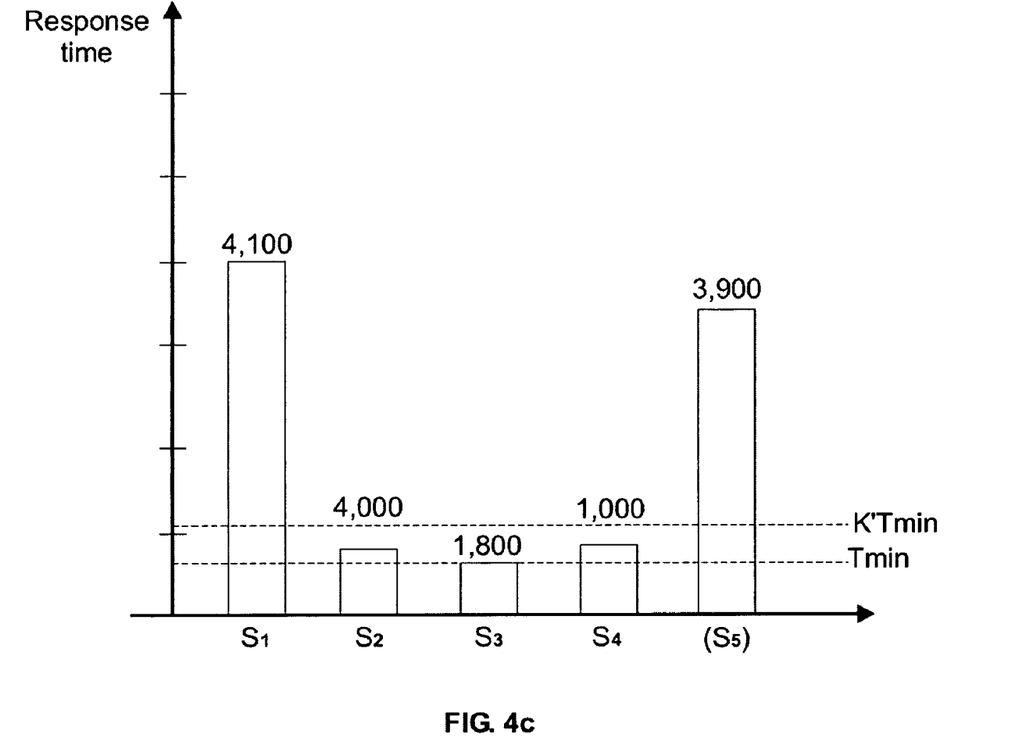

Let us assume now that a user of the client considered above (for example, consisting of a laptop computer) moves to the region of the runtime servers $S_2$-$S_4$. When the client runs the load balancing method in that region, a long response time of the (now remote) servers $S_1$,$S_5$ is detected (because of the long distance network connection), whereas the (now local) servers $S_2$-$S_4$ exhibits a low response time (being closer to the client). For example, as shown in the qualitative diagram of FIG. 4c, the response times and the workloads of the runtime servers $S_1$-$S_5$ are 40 and 4,100, 7 and 4,000, 6 and 1,800, 8 and 1,000 and 35 and 3,900, respectively. The acceptable range of the response times is defined by the lower limit $T_{min}$=6 ms and the upper limit $T_{max}$=1.5·$T_{min}$=9 ms. Therefore, the subset of the nearest servers will consist of the runtime servers $S_2$, $S_3$ and $S_4$; the runtime server $S_3$ is then set as the eligible server. In this situation, the comparison parameter COMP=3,900/1,800 is greater than the threshold value 1.1, and the preferred server is switched to the eligible server $S_3$.

Similar considerations apply if an equivalent method is implemented, if another registration procedure is used (for example, based on the authentication of the users), or if the parameters controlling the method have different values. However, the concepts of the present inventions are also applicable when the server list is distributed to the clients periodically (with a dedicated service), or when the clients are plugged and unplugged in a different way. Alternatively, the average response time is calculated discarding one or more of the highest values (so as to filter any transient slowdown of the network), the specific information of each client is transferred to the eligible server from the preferred server directly, and the like.

More generally, the present invention proposes a load balancing method for use in a data processing system with a distributed architecture; the system includes a plurality of servers and a plurality of clients. The method involves the execution of a series of steps for each client. Particularly, the method starts with the step of associating the client with a preferred one of the servers; the preferred server stores specific information for the client. An indication of a workload and an indication of a response time of each server are then detected. The method continues selecting an eligible one of the servers according to the workload and the response time of each server. One or more comparison parameters (indicative of a performance difference between the preferred server and the eligible server) are then calculated. In response to the reaching of a predefined threshold by the comparison parameter(s), the method involves switching the preferred server to the eligible server and transferring the specific information to the eligible server.

The proposed method exhibits a slow dynamic, which strongly reduces the switching of the clients between the different servers. Indeed, the method of the invention tends to reach a steady condition, wherein the specific information of the clients is not continuously moved across the system. In this way, the advantages of the load balancing method are not impaired by any overload of the network; as a consequence, the overall performance of the system is increased.

The preferred embodiment of the invention described above offers further advantages. Particularly, the performance difference corresponding to the threshold is at least 5%. This feature ensures that the clients will not switch their preferred server unless a significant performance change occurs. In this way, the dynamic of the method is further slowed down; the resulting behavior is desirable in many practical situations (for example, in large systems with a high number of clients).

A suggested choice for defining the comparison parameter is that of calculating the ratio between the workload of the preferred server and the workload of the eligible server. The proposed formula provides an acceptable degree of precision with a very low computational load. However, the solution according to the present invention leads itself to be implemented calculating the comparison parameter in another way (for example, as a linear function of both the response time and the workload of the servers), or with a different threshold value. Alternatively, two or more threshold values are used, or the threshold is defined according to other criteria; for example, the client switches only when the comparison parameter exceeds the threshold value for a predefined number of consecutive times, or as soon as the workload of the eligible server is lower than the workload of the preferred server and the response time of the preferred server is longer than an acceptable value at the same time.

In a preferred embodiment of the invention, the response time of each runtime server is calculated measuring the time elapsed between the sending of a request to the runtime server (for information about its workload) and the receiving of the corresponding response. This technique provides very reliable results, which take into account all the factors affecting the response times of the servers (such as their geographical distance, the topology of the network, the connection speed, and so on). A way to further improve the solution is to log the most recent values measured for each runtime server; the response time of the runtime server is then calculated according to the average of the logged values. The proposed solution is a good compromise between the opposed requirements of reliability and simplicity.

Advantageously, the workload of each runtime server is calculated according to the number of clients that are plugged. This method is very easy to implement, but at the same time quite effective. As a further enhancement, the workload is obtained dividing the number of clients by a power factor of the runtime server.

The proposed algorithm provides a more reliable measure of the actual capability of the runtime servers. Moreover, the same technique can be used to move the clients to or from a desired runtime server (by setting the respective power factor at will); for example, this feature is advantageous when the clients must be unplugged from a runtime server that will be disconnected from the system.

In any case, the solution according to the invention is suitable to be implemented detecting either the response time or the workload of the runtime servers in a different way. For example, in alternative embodiments the workload is calculated according to the time required for executing a predefined operation on the runtime server, the response time is set to the last measured value (without performing any average), or it is based on a geographical position of the runtime server (for example, calculating a difference between the time zone of the client and the time zone of the runtime server).

In a preferred embodiment of the invention, the eligible server is selected establishing an acceptable range of the response times, creating a subset of runtime servers having the response time within the acceptable range, and setting the eligible server to the runtime server of the subset having the lowest workload.

The proposed algorithm has been found to provide very good performance. Advantageously, the acceptable range is established setting its lower limit to the lowest response time and its upper limit to the lowest response time multiplied by a predefined factor. This method makes it possible to select the runtime servers nearest to the client (from a network point of view).

A way to further improve the solution is to maintain the server list on the main server; the server list is distributed to the runtime servers and then to the plugged clients. The proposed feature avoids the administration task of manually replicating the server list on all the clients.

Alternatively, the solution of the invention can be implemented with different algorithms; for example, the subset of runtime servers is established including a predefined number of nearest runtime servers or all the runtime servers having a response time shorter than a threshold value, the eligible server is selected minimizing an object function (for example, based on both the response time and the workload of the runtime servers), and the like. Moreover, the proposed method is also suitable to be put into practice without any automatic distribution of the server list from the main server.

Advantageously, the solution according to the present invention is implemented with a computer program, which is provided as a corresponding product stored on a suitable medium. Preferably, the execution of the method is controlled on the client side (so that no listening capability is required on the part of the clients). In this case, the same program is installed on each client; moreover, it should be noted that the program is also suitable to be put on the market as a stand-alone product for use in a pre-existing system.

Alternatively, the program is preloaded onto the hard disks, is sent to the computers through the network, is broadcast, or more generally is provided in any other form directly loadable into the working memories of the computers. However, the method according to the present invention leads itself to be carried out under the control of the runtime servers, or even with a hardware structure (for example, integrated in a chip of semiconductor material).

Naturally, in order to satisfy local and specific requirements, a person skilled in the art may apply to the solution described above many modifications and alterations all of which, however, are included within the scope of protection of the invention as defined by the following claims.

What is claimed is:

1. A load balancing method for use in a data processing system with a distributed architecture including a plurality of servers and a plurality of clients, the method comprising for at least one client the steps of:
    associating the client with a preferred one of the servers, the preferred server storing specific information for the client;
    detecting an indication of a workload and an indication of a response time of each server;
    selecting an eligible one of the servers according to the workload and the response time of each server, wherein the step of selecting the eligible server includes:
    (1) establishing an acceptable range of the response times, wherein the step of establishing the acceptable range includes setting a lower limit of the acceptable range to a lowest response time of the servers and setting an upper limit of the acceptable range to the lowest response time multiplied by a predefined factor;
    (2) selecting a subset of the servers having the response time within the acceptable range; and
    (3) setting the eligible server to a server of the subset having a lowest workload;
    calculating at least one comparison parameter indicative of a performance difference between the preferred server and the eligible server; and
    switching the preferred server to the eligible server and transferring the specific information to the eligible server in response to the reaching of a predefined threshold by the at least one comparison parameter.

2. The method of claim 1, wherein the performance difference corresponding to the threshold is at least 5%.

3. The method of claim 1, wherein the at least one comparison parameter consists of a ratio between the workload of the preferred server and the workload of the eligible server.

4. The method of claim 1, wherein the step of detecting the indication of the workload and the indication of the response time of each server includes:
    sending a request to the server;
    receiving a response indicative of the workload from the server;
    measuring a time elapsed between the sending of the request and the receiving of the response; and
    determining the response time according to at least one of the elapsed times.

5. The method of claim 4, wherein the step of determining the response time includes:
    logging a plurality of elapsed times being measured most recently; and
    calculating the response time according to an average of the logged elapsed times.

6. The method of claim 1, wherein the step of detecting the indication of the workload and the indication of the response time of each server further includes:
    determining the number of clients associated with the server; and
    determining the workload according to the number of clients.

7. The method of claim 6, wherein the step of determining the workload according to the number of clients includes dividing the number of clients by a power factor of the server.

8. The method of claim 1, further comprising the steps of:
    providing a list identifying the servers;
    distributing the list to the servers; and
    distributing the list from each server to the clients associated therewith.

9. The method of claim 1, comprising the enumerated steps for each client.

* * * * *